United States Patent
Schorr et al.

(10) Patent No.: US 6,608,697 B1
(45) Date of Patent: Aug. 19, 2003

(54) PREFLIGHT SYSTEM THAT PROVIDES A UNIVERSAL RESOURCE LOCATOR ADDRESS ASSOCIATED WITH A DETECTED PRINT FILE ERROR

(75) Inventors: Joseph Schorr, Canby, OR (US); Tara E. Starr, Portland, OR (US); Raymond J. Marshall, West Linn, OR (US); Todd Whitaker, Portland, OR (US); Blake L. Sliter, Portland, OR (US)

(73) Assignee: Extensis, Inc., Portland, OR (US)

( * ) Notice: Subject to any disclaimer, the term of this patent is extended or adjusted under 35 U.S.C. 154(b) by 56 days.

(21) Appl. No.: 09/625,737

(22) Filed: Jul. 26, 2000

(51) Int. Cl.[7] .............................................. G06K 15/00
(52) U.S. Cl. ..................... 358/1.15; 358/1.14
(58) Field of Search ................... 358/1.1–1.9, 1.11–1.18

(56) References Cited

U.S. PATENT DOCUMENTS

| | | | |
|---|---|---|---|
| 4,651,278 A | 3/1987 | Herzog et al. ............. | 358/1.18 |
| 4,754,428 A | 6/1988 | Schultz et al. ............. | 709/246 |
| 4,839,829 A * | 6/1989 | Freedman .................. | 364/519 |
| 4,849,883 A | 7/1989 | Mitchell et al. ............. | 358/1.1 |
| 5,167,013 A | 11/1992 | Hube et al. ................. | 358/1.16 |
| 5,179,637 A | 1/1993 | Nardozzi ................... | 358/1.15 |
| 5,210,824 A | 5/1993 | Putz et al. .................. | 715/523 |
| 5,347,578 A | 9/1994 | Duxbury ...................... | 709/9 |
| 5,400,243 A | 3/1995 | Oheda et al. .............. | 358/1.18 |
| 5,436,730 A | 7/1995 | Hube ....................... | 358/1.16 |
| 5,574,664 A | 11/1996 | Feasey ....................... | 702/107 |
| 5,625,757 A | 4/1997 | Kageyama et al. ........ | 358/1.15 |
| 5,625,818 A | 4/1997 | Zarmer et al. ............... | 707/9 |
| 5,634,091 A | 5/1997 | Sands et al. .............. | 358/1.18 |
| 5,739,809 A | 4/1998 | McLaughlin et al. ....... | 345/594 |
| 5,784,622 A | 7/1998 | Kalwitz et al. ............. | 396/647 |
| 5,928,335 A | 7/1999 | Morita ....................... | 709/203 |
| 5,937,397 A * | 8/1999 | Callaghan .................. | 706/10 |
| 5,961,603 A * | 10/1999 | Kunkel et al. .............. | 709/229 |
| 5,963,641 A * | 10/1999 | Crandall et al. ............. | 380/2 |
| 6,006,281 A | 12/1999 | Edmunds ..................... | 710/1 |
| 6,020,973 A | 2/2000 | Levine et al. ............. | 358/1.15 |
| 6,067,559 A | 5/2000 | Allard et al. .............. | 709/202 |
| 6,119,137 A | 9/2000 | Smith et al. ................ | 710/305 |
| 6,198,526 B1 * | 3/2001 | Ohtsuka ..................... | 355/40 |

OTHER PUBLICATIONS

*Extensis Preflight Pro User Guide Version 2.1 for Macintosh®*, Extensis Corporation, published 1988, pp. 1–216.
"Checking Files Before Takeoff," Bob Schaffel and Chuck Weger, *MacUser*, Nov. 1994, p. 113.
"Packing a Preflight Tool Kit," Bob Schaffel and Chuck Weger, *MacUser*, Dec. 1994, p. 127.
Press Release "Markzware, Inc., Announces Web Based Preflight Solution At Seybold In San Francisco," by Markzware, Inc., dated Aug. 25, 1999.
Press Release "Markzware, Inc. Delivered The First Commercial Version Of The Marknet Online Preflighting Solution to Printable.com," by Markzware, Inc., dated Sep. 25, 2000.

* cited by examiner

*Primary Examiner*—Gabriel Garcia
*Assistant Examiner*—King Y. Poon
(74) *Attorney, Agent, or Firm*—Banner & Witcoff, Ltd.

(57) ABSTRACT

A preflight system has a printer profile database containing a list of problem document elements and a list of universal resource locator addresses. Each of the universal resource locator addresses is associated with at least one of the problem document elements. The preflight system also has an analyzer that compares document elements from a print file submitted by a print buyer with the problem document elements, in order to identify those document elements occurring in the print file that may cause a problem during printing. The analyzer then compiles a list of the universal resource locator addresses associated with problem document elements found in the print file.

6 Claims, 9 Drawing Sheets

Specify Files:

Drag a file from your desktop into the region at right or click "Browse" and select files.

If you use a proxy server, click "Proxy Settings" to enter your specific settings.

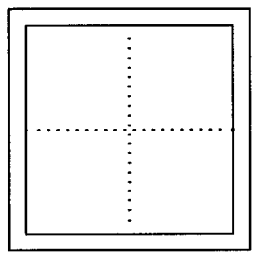

Browse to locate files or configure proxy server settings.

[Browse]

[Proxy Settings]   405

[Reset]   [Continue]

407

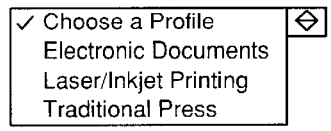
- ✓ Choose a Profile
- Electronic Documents
- Laser/Inkjet Printing
- Traditional Press For help with plug-in installation, click here

401

Copyright 2000 Creativepro.com, Inc.

FIG. 4

Inspection Report

Preflight Online has detected some possible problems in your document(s). Some of the conditions reported below may cause unexpected results during the printing of your files.

Click any of the items listed below for instructions on how to fix the problems listed.

This job was inspected using the Traditional Press PDF profile.

*funnnnnnnnnnn.pdf*

This PDF was saved for compatibility with Acrobat version 4.0 (PDF 1.3 compatible).

The effective resolution of a color or grayscale graphic is too low.
Im1 , page 1

Color or grayscale graphic was saved with ZIP/LZW compression.
Im1 , page 1

An indexed color mode graphic is used in the PDF.
Im1 , page 1

703A

*funnnnnnnnnnn2.pdf*

CAUTION: Security settings may impact the ability to accurately preflight this file.

This PDF was saved for compatibility with Acrobat version 4.0(PDF 1.3 compatible).

This PDF contains blank pages.
page 1

Document Security for this PDF does not allow editing.

703B

*funnnnnnnnnnn3.pdf*

CAUTION: Security settings may impact the ability to accurately preflight this file.

This PDF was saved for compatibility with Acrobat version 4.0(PDF 1.3 compatible).

This PDF contains blank pages.
page 1

Document Security for this PDF does not allow editing.

703C

| Detailed Info. | Recheck Files | Collection | Finish |

Copyright 2000 Creativepro.com, Inc.

PREFLIGHT SYSTEM THAT PROVIDES A UNIVERSAL RESOURCE LOCATOR ADDRESS ASSOCIATED WITH A DETECTED PRINT FILE ERROR

RELATED APPLICATION INFORMATION

This application is related to (1) the copending U.S. Patent Application entitled "A Preflight System That Preflights Print Files On A Pass-Fail Basis," filed concurrently herewith and naming Raymond J. Marshall as inventor, which application is incorporated entirely herein by reference; (2) the copending U.S. Patent Application entitled "A Preflight System That Employs Inspector Programs Specific To A Print File Type," filed concurrently herewith and naming Raymond J. Marshall as inventor, which application is incorporated entirely herein by reference; (3) the copending U.S. Patent Application entitled "A Preflight System Having A Print Buyer Interface Provided Through A Print Vendor," filed concurrently herewith and naming Raymond J. Marshall as inventor, which application is incorporated entirely herein by reference; (4) the copending U.S. Patent Application entitled "A Preflight System That Allows A Print Buyer To Employ Print Profiles From A Plurality Of Print Vendors," filed concurrently herewith and naming Raymond J. Marshall as inventor, which application is incorporated entirely herein by reference; (5) the copending U.S. Patent Application entitled "A Preflight System That Flags Specific Print File Errors For Review By A Print Vendor," filed concurrently herewith and naming Raymond J. Marshall as inventor, which application is incorporated entirely herein by reference; (6) the copending U.S. Patent Application entitled "A Preflight System That Charges A Fee Each Time A Print Buyer Uses The System To Preflight A Print File," filed concurrently herewith and naming Raymond J. Marshall as inventor, which application is incorporated entirely herein by reference; (7) the copending U.S. Patent Application entitled "A Preflight System That Automatically Forwards A Preflighted Print File To A Print Vendor For Printing," filed concurrently herewith and naming Raymond J. Marshall as inventor, which application is incorporated entirely herein by reference; (8) the copending U.S. Patent Application entitled "A Method Of Preflighting That Provides A Universal Resource Locator Address Associated With A Detected Print File Error," filed concurrently herewith and naming Raymond J. Marshall as inventor, which application is incorporated entirely herein by reference; (9) the copending U.S. Patent Application entitled "A Method Of Preflighting Print Files On A Pass-Fail Basis," filed concurrently herewith and naming Raymond J. Marshall as inventor, which application is incorporated entirely herein by reference; (10) the copending U.S. Patent Application entitled "A Method Of Preflighting A Print File That Employs Inspector Programs Specific To The Print File Type," filed concurrently herewith and naming Raymond J. Marshall as inventor, which application is incorporated entirely herein by reference; (11) the copending U.S. Patent Application entitled "A Method Of Preflighting Using A Print Buyer Interface Provided Through A Print Vendor," filed concurrently herewith and naming Raymond J. Marshall as inventor, which application is incorporated entirely herein by reference; (12) the copending U.S. Patent Application entitled "A Method Of Preflighting Where A Print Buyer May Employ Print Profiles From A Plurality Of Print Vendors," filed concurrently herewith and naming Raymond J. Marshall as inventor, which application is incorporated entirely herein by reference; (13) the copending U.S. Patent Application entitled "A Method Of Preflighting That Flags Specific Print File Errors For Review By A Print Vendor," filed concurrently herewith and naming Raymond J. Marshall as inventor, which application is incorporated entirely herein by reference; (14) the copending U.S. Patent Application entitled "A Method Of Preflighting That Charges A Fee Each Time A Print Buyer Preflights A Print File," filed concurrently herewith and naming Raymond J. Marshall as inventor, which application is incorporated entirely herein by reference; and (15) the copending U.S. Patent Application entitled "A Method Of Preflighting Including Automatically Forwarding A Preflighted Print File To A Print Vendor For Printing," filed concurrently herewith and naming Raymond J. Marshall as inventor, which application is incorporated entirely herein by reference.

BACKGROUND OF THE INVENTION

1. Field of the Invention

This invention is directed to a preflight system that allows a print buyer to submit a print file for preflighting from a remote user interface. More particularly, the invention is directed to a method and system that allow a print buyer to seamlessly integrate a preflight process into its workflow with a print vendor, by, for example, preflighting a print file via a remote preflight system using an interface associated with the print vendor.

2. Background of the Invention

Preflighting is the process of reviewing print information for errors or possible printing problems before actually printing the information. This process is important because a printing press can be very expensive to set up and run. Further, a print run may require hundreds of thousands of sheets of paper, special binding procedures, etc. If errors or problems in a print job are not caught before the printing job is completed, it can be very costly to reprint the job.

Currently, print buyers who wish to have something printed will submit it in digital form to a print vendor (e.g., a printer with a printing press or a print broker who passes the item on to a printer with a printing press). In theory, this allows the print file containing the item to be easily preflighted by computer analysis, but this has not worked out in practice. While the print vendor can preflight the print file, the print vendor cannot correct all of the errors that are detected. Instead, to correct most errors, the print vendor must either return the print file to the print buyer or obtain additional information from the print buyer. This can significantly delay printing of the item.

The print buyer, on the other hand, may not be aware of the need to preflight a print file before submitting it to a print vendor. Even if a print buyer is sophisticated enough to appreciate the need for preflighting, the preflighting process is still time consuming for the print buyer. The print buyer must obtain a preflighting program, preflight the print file, and correct any detected errors before submitting the print file to a print vendor. If the print buyer obtains the preflighting program from a source other than the print vendor being used by the print buyer, then the preflighting program may not recognize possible print errors that are specific to the print vendor. On the other, if the print buyer obtains its preflighting program from one print vendor, then the program may not recognize print errors specific to other print vendors. Instead, the print buyer must obtain new preflighting criteria for each new print vendor it employs.

SUMMARY OF THE INVENTION

Accordingly, there is a need for a preflight system that seamlessly integrates into the print buyer's workflow.

Advantageously, some embodiments of the invention allow a print buyer to access a preflight system using an interface provided through a print vendor. Thus, in the process of working with a print vendor, a print buyer can easily preflight print files prior to printing. Various embodiments of the invention may further allow the preflight system to pass error free print files along to the print vendor, or to pass print files having correctable errors along to the print vendor with a list identifying the correctable errors for the print vendor.

In accordance with some embodiments of the invention, a preflight system provide an interface Web page accessible through a print vendor's Web site, so that a print buyer can access the preflight system through the print vendor's Web site. Upon interfacing with the preflight system, the system provides inspector modules to the print buyer's client machine. These inspector modules inspect the print file, and convey the detected document elements back to the analyzer of the preflight system. The analyzer compares the detected document elements with a list of elements in one or more selected printer profiles provided by the print vendor, to any of the document elements that may present a problem during printing. The analyzer then compiles a list of error messages associated with the identified document elements. By accessing the preflight system through the print vendor, the print buyer is not hardwired to one particularly vendor. Further, as will be understood by reviewing the description of the preferred embodiments below, the print buyer can employ the preflight system according to the invention through potentially any print vendor.

BRIEF DESCRIPTION OF THE DRAWINGS

FIGS. 4 and 5 show two file submission interface pages according to one embodiment of the invention.

FIG. 7 shows an error listing Web page according to one embodiment of the invention.

DETAILED DESCRIPTION OF THE PREFERRED EMBODIMENTS

Figure 1A:
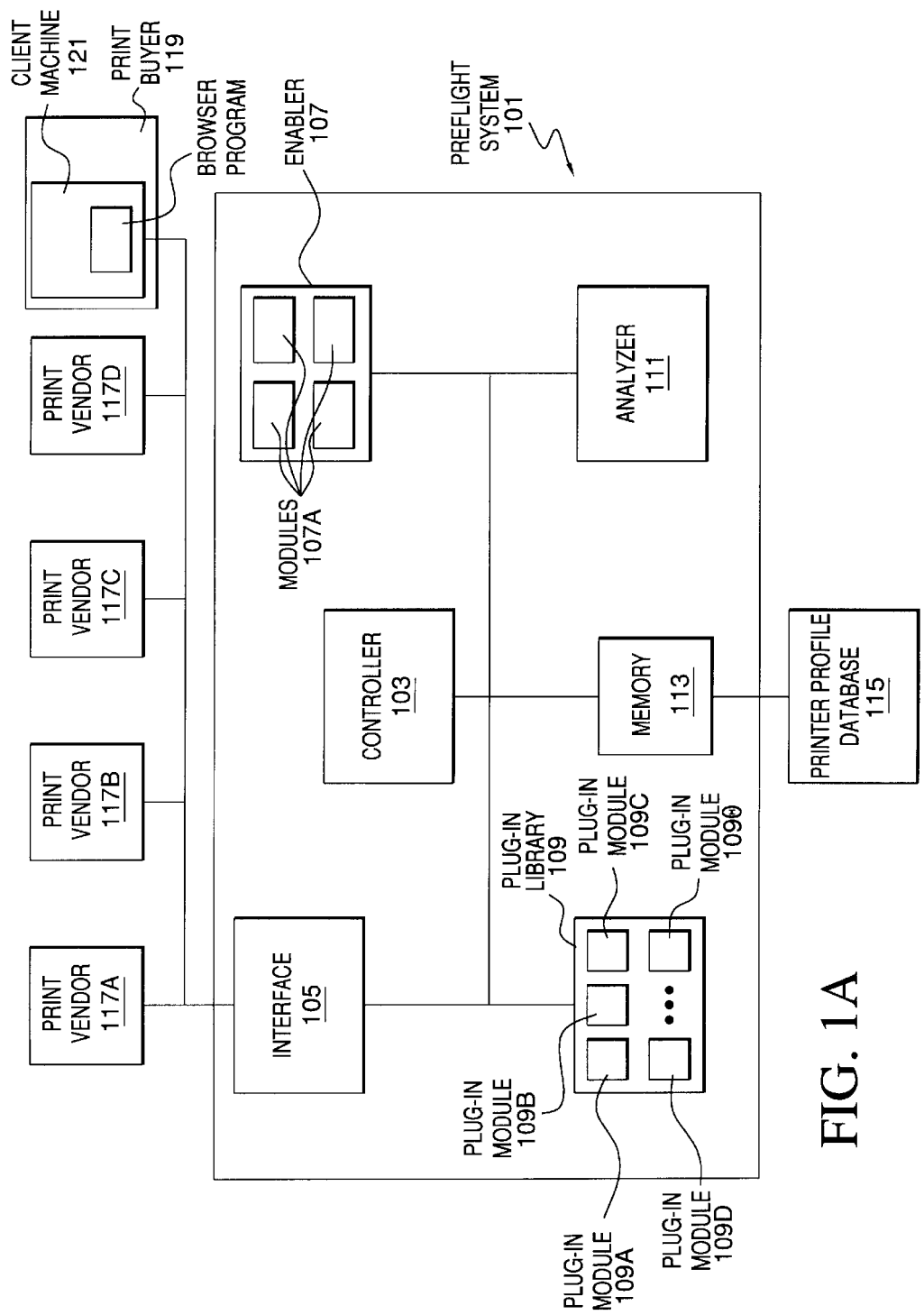
FIG. 1A illustrates a block diagram of the preflight system according to one embodiment of the invention.

Turning now to FIG. 1A, this figure shows the components of the preflight system 101 according to one embodiment of the invention. The preflight system 101 includes a controller 103, an interface 105, an enabler 107, a plug-in library 109, an analyzer 111 and a memory 113. Each of these components may be embodied on a single computer server, or may be embodied on a system of interconnected computer servers. Also, as will be explained in detail below, the enabler 107 and the plug-in library 109 have modules that are downloaded to a user's computer for operation on that local machine. The preflight system 101 operates according to printer profile data stored in the printer profile database 115. While the printer profile database 115 is illustrated as being separate from the preflight system 101 in FIG. 1A, those of ordinary skill in the art will appreciate that the printer profile database 115 can alternately be incorporated into the preflight system 101.

As will be seen from FIG. 1A, the preflight system 101 may be used by both a plurality of print vendors 117A–117D and by a print buyer 119. The print vendors 117A–117D are companies or organizations that will print information on a medium for the print buyer 119, while the print buyer 119 may be an individual or organization that desires to have information professionally printed onto a medium. Typically, the print buyer 119 will provide a print file, containing the information to be printed, to one of the print vendors 117 for printing. The print buyer 119 may transmit the print file to the print vendor 117 over a network, such as the Internet. Alternately, the print buyer 119 may submit the print file to the print vendor on a memory storage medium, such as a CD-ROM or magnetic media disc (e.g., a Zip disc).

For most preferred embodiments of the invention, the print buyer 119 will have (or have access to) a client machine 121 that is capable of receiving operational files (e.g., plug-in programs) over a network, such as the Internet. More particularly, the client machine 121 will also preferably be able to run a browser program 123, such as Microsoft Explorer or Netscape Navigator, for retrieving information from a network such as the Internet.

The components of the preflight system 101 will now be described in detail. As will be appreciated by those of ordinary skill in the art, the controller 103 coordinates the operation of the other components 105–113 and the transfer of data between these components 105–113. The interface 105 provides an interface between the preflight system 101 and at least the print buyer 119. In some preferred embodiments of the invention, the interface 105 provides an initial interface page (such as an HTML "Web" page, to be described in detail later) for each of print vendors 117A–117D. The print buyer 119 can then use its browser 123 to download an appropriate enabler module 107A and various plug in programs 109A–109θ through the interface page of the print vendor 117 that the print buyer 119 is employing to print the print file.

According to some embodiments of the invention, the enabler 107 includes enabler modules 107A that function to provide both a user interface for the print buyer 119 and as a "plug-in" manager for the client machine's browser 123. More specifically, the enabler 107 includes enabler modules 107A that can be downloaded to the client machine 121 to plug into the browser 123. As is well known in the art, a "plug-in" program is a supplemental program that works in conjunction with a basic application to add additional functionality to that basic application. In some preferred embodiments of the invention, the enabler 107 includes four different enabler modules 107A, one for each type of commonly used browser program (i.e., the first for use with Microsoft Explorer running on the Microsoft Windows operating system, another for use with Netscape Navigator running on the Microsoft Windows operating system, the third for use with Microsoft Explorer running on the Apple Macintosh operating system, and the fourth for use with Netscape Navigator running on the Apple Macintosh operating system). Of course, those of ordinary skill in the art will appreciate that the enabler 107 can have more or fewer enabler modules 107A depending upon the intended market for the preflight system 101.

Once the enabler module 107A for browser 123 has been downloaded to the client machine 121 of a print buyer 119, the downloaded enabler module 107A plugs into the browser 123 to provide a plug-in interface. As will be discussed in detail below, the enabler module 107A allows any of the multiple plug-in modules 109A–109θ of the same operating system type to plug into the browser 123. According to some embodiments of the invention, the enabler module 107A may also cooperate with the interface 105 to provide the print buyer 119 with interface Web pages. (According to alternate embodiments of the invention, however, this function may be performed by another plug-in module stored in the plug-in library 109, such as the plug-in module 109B.) As will also be discussed in detail below, the print buyer 119 uses this initial interface page to employ the preflight system 101 to preflight print files. With some embodiments of the invention, the enabler module 107A may additionally be used to identify the file type of each print file submitted by the print buyer 119 for preflighting.

Figure 1B:
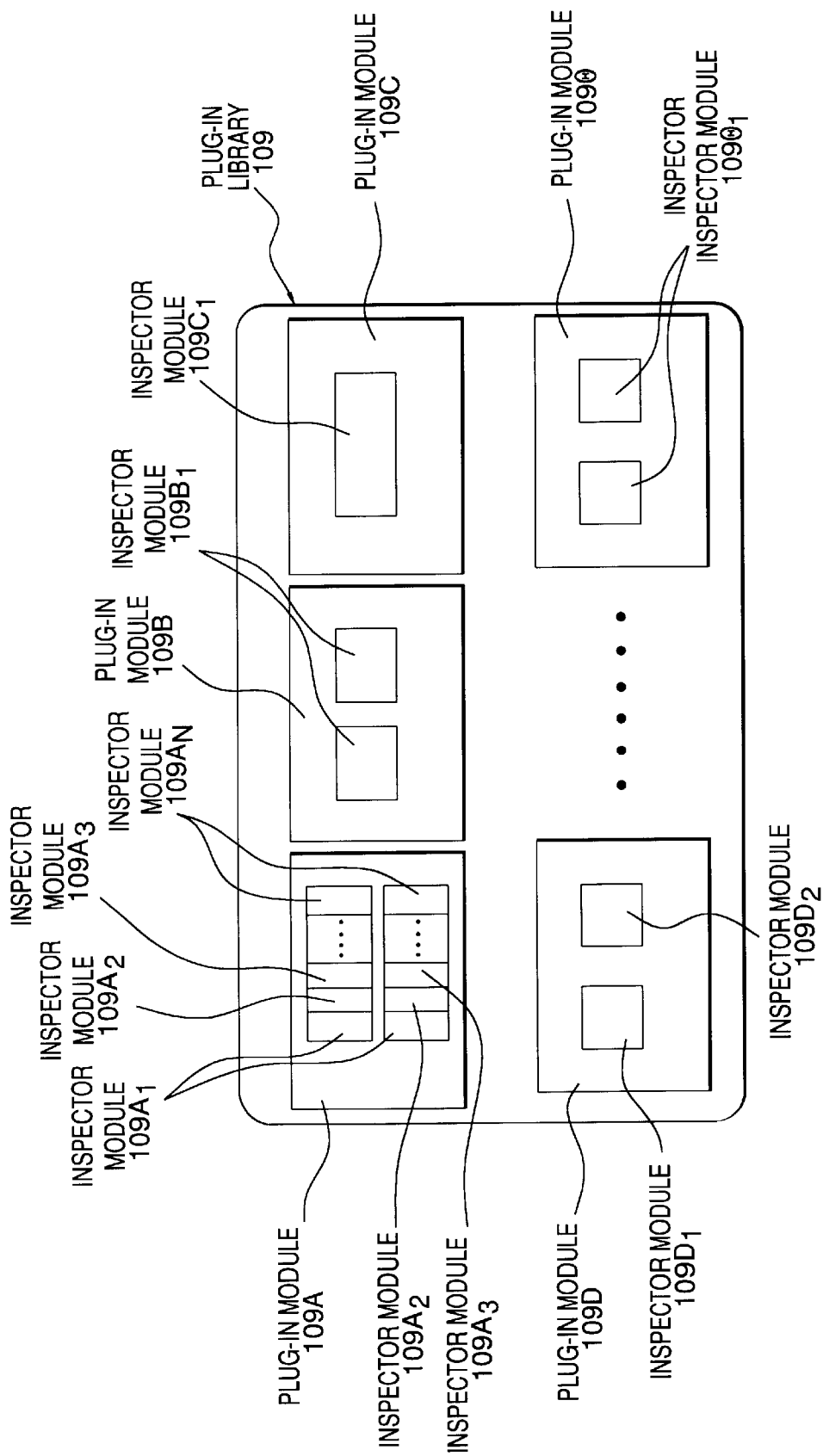
FIG. 1B illustrates a block diagram of the plug-in library shown in FIG. 1A.

As seen in FIG. 1B, the plug-in library 109 includes at least one set of inspector modules $109A_1$–$109A_n$. Preferably, each inspector module 109A is designed to scan through a particular file type for document elements (i.e., the elements that make up the print file). Thus, each module 109A corresponds to a file type that can be preflighted by the preflight system 101. For example, inspector module $109A_1$ may be a module for scanning QuarkXpressfiles, while $109A_2$ may be a module for scanning Adobe Photoshop files and $109A_3$ may be a module for scanning Microsoft Word files. The enabler module 107B downloads specific inspector modules 109A from the plug-in library 109 to the client machine 121 that correspond to the print file types submitted by the print buyer 119 for preflighting. For example, if the print buyer 119 submitted a QuarkXpressprint file for preflighting, then the enabler module 107A would download the inspector module $109A_1$ (specific to scanning QuarkXpressfiles) from the plug-in library 109 to scan the print file. Further, the plug-in library 109 will provide as many different inspector modules 109A as necessary to completely scan the print file. Thus, if the print file is a QuarkXpressfile containing an embedded Adobe Photoshop file (or if it contains a link to an Adobe Photoshop file), the enabler module 107A will download both the inspector module $109A_1$ for scanning the QuarkXpressfile and the inspector module $109A_2$ for scanning the embedded (or linked) Adobe Photoshop file.

Preferably, the inspector modules 109A operate as plug-ins to the browser 123. As is known in the art, however, each browser program requires a specific type of plug-in format (e.g., Internet Explorermay require an ActiveX plug-in format). Thus, the plug-in library 109 typically would need several set of inspector modules $109A_1$ to $109A_N$, one for each type of browser 123 that might be employed on the client machine 121. Instead, as previously noted, the enabler 107 includes an enabler module 107A for each type of browser 123 that might be employed by the print buyer 119. The enabler module 107A corresponding to the browser 123 then acts as a plug-in interface between that browser and the inspector modules $109A_1$ to $109A_N$. In particular, the enabler module 107A allows any inspector module 109A that is compatible with the operating system of the client machine 121 to be used with the browser 123. Thus, one embodiment of the preflight system 101 may employ only two sets of inspector modules $109A_1$ to $109A_N$: one set for a client machine 121 using the Microsoft Windows operating system, and one set for a client machine 121 using the Apple Macintosh operating system. Of course, those of ordinary skill in the art will appreciate that other embodiments of the invention can include additional sets of inspector modules $109A_1$ to $109A_N$ for other operating systems, such as Unix or Linux.

As seen in FIG. 1B, the plug-in library 109 may include a variety of other plug-in modules 109B–109θ for performing other functions associated with the preflight system 101. For example, as previously noted, instead of the enabler module 107A retrieving an initial interface Web page for submitting a document for preflighting, plug-in module 109B may perform this function. Further, other plug-in modules 109C–109θ may carry out other functions (particularly interface functions), such as allowing the print buyer 119 to submit documents for preflighting by dragging and dropping them onto the initial interface Web page, as will be discussed in detail below. Preferably, like the plug-in modules $109A_1$ the plug-in modules 109B–109θ cooperate with the enabler module 107A. The different groups of plug-in modules 109B–109θ may include any combination of plug-in modules, such as different versions of the same module for use with different operating systems (e.g., modules 109B and 109θ in FIG. 1B), different modules for use with a single operating system (e.g., modules 109D in FIG. 1B), a single module (e.g., module 109C in FIG. 1B), etc.

Returning now to the inspector modules 109A, an inspector module 109A that has been downloaded to the client machine 121 scans through the designated print file, identifies document elements in the print file, and then transmits the identified document elements to the preflight system 101 (i.e., to the analyzer 111) for analysis. With some embodiments of the invention, the inspector modules 109A create a memory file on the client machine 121 for storing detected document elements. The inspector module 109A can then periodically transmit the contents of the memory file to the analyzer 111, or alternately wait until the scan of the print file has been completed to transmit the contents of the memory file to the analyzer 111. This technique reduces the number of transmissions required between the client machine 121 and the preflight system 101. With other preferred embodiments of the invention, however, the inspector modules 109A immediately relay the detected document elements to the preflight system 101, without storing any of the document elements in the memory of the client machine 121. This technique is particularly advantageous in that it can significantly reduce the time required to provide the analyzer 111 with the document elements from the print file. This technique also uses less memory in the client machine 121, as print files are often quite large.

The analyzer 111 works in conjunction with information from the printer profile database 115 to recognize particular document elements from the print file being preflighted. Each of print vendors 117A–117D sets up one or more printer profiles in the printer profile database 115. These profiles define the document elements that the print vendor 117 believes may present a problem when it goes to print the print file. For example, print vendor 117A may not have a printing press capable of printing a RGB (red-green-blue) color image. The print vendor 117A may then have its printer profile designate any document element indicating a RGB color image as an erroneous document element. If print vendors 117B and 117C both have presses capable of printing a RGB color image, then the printer profiles for these vendors might not designate RGB color image document elements as erroneous. Similarly, if print vendor 117C does not have a press capable of printing a resolution higher than 800 dpi (dots per inch), then vendor 117C may set up its printer profile to indicate that any document elements representing a resolution higher than 800 dpi should be treated as erroneous document elements. If print vendors 117A and 117B are capable of higher resolutions, however, then their printer profiles may not indicate that document elements representing a resolution higher than 800 dpi are erroneous.

Of course, those of ordinary skill in the art will appreciate that more sophisticated printer profiles can be employed. For example, a printer profile could indicate that a particular document element is a problem if, and only if, it immediately follows another specific document element. Thus, according to other embodiments of the invention, printer profiles could be set up to signal an error for any logical combination of document elements (or absence of document elements).

In some preferred embodiments of the invention, a printer profile is formed by a database cross-referencing each erroneous document element (i.e., each document element or logical combination of document elements (or absence of document elements) designated by the print vendor to be treated as an erroneous document element) against an error message selected by the print vendor 117. Thus, two different print vendors 117 may provide different error messages for the same document element. For a document element representing a resolution of 1200 dpi, for example, print vendor 117C may provide an error message indicating that it cannot print at a resolution higher than 800 dpi. Print vendor 117B, on the other hand, may associate this document element with an error message saying that it will require an additional two weeks over its normal turnaround time to print an image with a resolution of 1200 dpi. Some preferred embodiments of the invention may include a universal resource locator (URL) address in the error message. As will be explained in detail below, this allows a print vendor 117 to direct a print buyer 119 to a Web page particularly designated (or provided) by the print vendor 117 to address the erroneous document element.

Thus, the printer profiles according to the invention allow individual print vendors to develop printer profiles tailored to their specific printing capability. Moreover, with the invention, a single preflight system can employ different profiles from different print vendors. With some embodiments of the invention, each print vendor can even maintain more than one printer profile in the printer profile database 115. For example, a print vendor 117 with five different presses could set up a printer profile for each press. Print buyer 119 could then preflight a print file using all five printer profiles for that vendor, to determine which of the vendor's presses required the fewest (or easiest) changes to the print file before printing. Alternately, if the print vendor 117A changed the configuration of its press based upon time (e.g., each week) then the print vendor 117A could choose to have four different profiles, one for each week of the month.

According to some preferred embodiments of the invention, the print vendors 117 can access the print profile database 115 at any time to immediately change their respective printer profiles, without otherwise involving the preflight system 101. This allows print vendors 117 maximum flexibility to modify their print profiles to correspond with the current set-ups of their presses. More significantly, the print vendors 117 do not need to contact or interact with the print buyer 119 in any way in order to immediately make their profiles available for use by the print buyer 119.

As previously noted, the analyzer 111 works with the printer profile database 115 to recognize particular document elements from the print file being preflighted. More particularly, the analyzer 111 compares each document element retrieved by the inspector module or modules 109A with the documents elements listed in the printer profile. When the analyzer 111 recognizes a retrieved document element as one listed as erroneous in the printer profile, the analyzer 111 obtains the error message associated with the erroneous document element, and stores that error message if memory 113. It should be noted that, with the preflight system 101 according to the invention, the analyzer 111 can be generic to all print file types. That is, because the analyzer 111 simply reviews the document elements identified by the inspector modules 109A, a single analyzer 111 can be employed to analyze any type of print file.

After the inspector or inspectors 109A have finished scanning through a print file, and the analyzer 111 has stored all of the relevant error messages in memory, the interface 105 may take several different courses of action, depending upon the embodiment of the invention. For example, the analyzer 111 may post the list of error messages to a Web page that can be accessed by the print buyer 119. If there print file contains no errors, then the analyzer 111 may instead simply forward the print file to the print vendor 117 selected by the print buyer. Still further, if the selected print vendor 117 can correct the noted errors, the analyzer may provide both the print file and the list of errors directly to the print vendor 117.

Figure 2A:
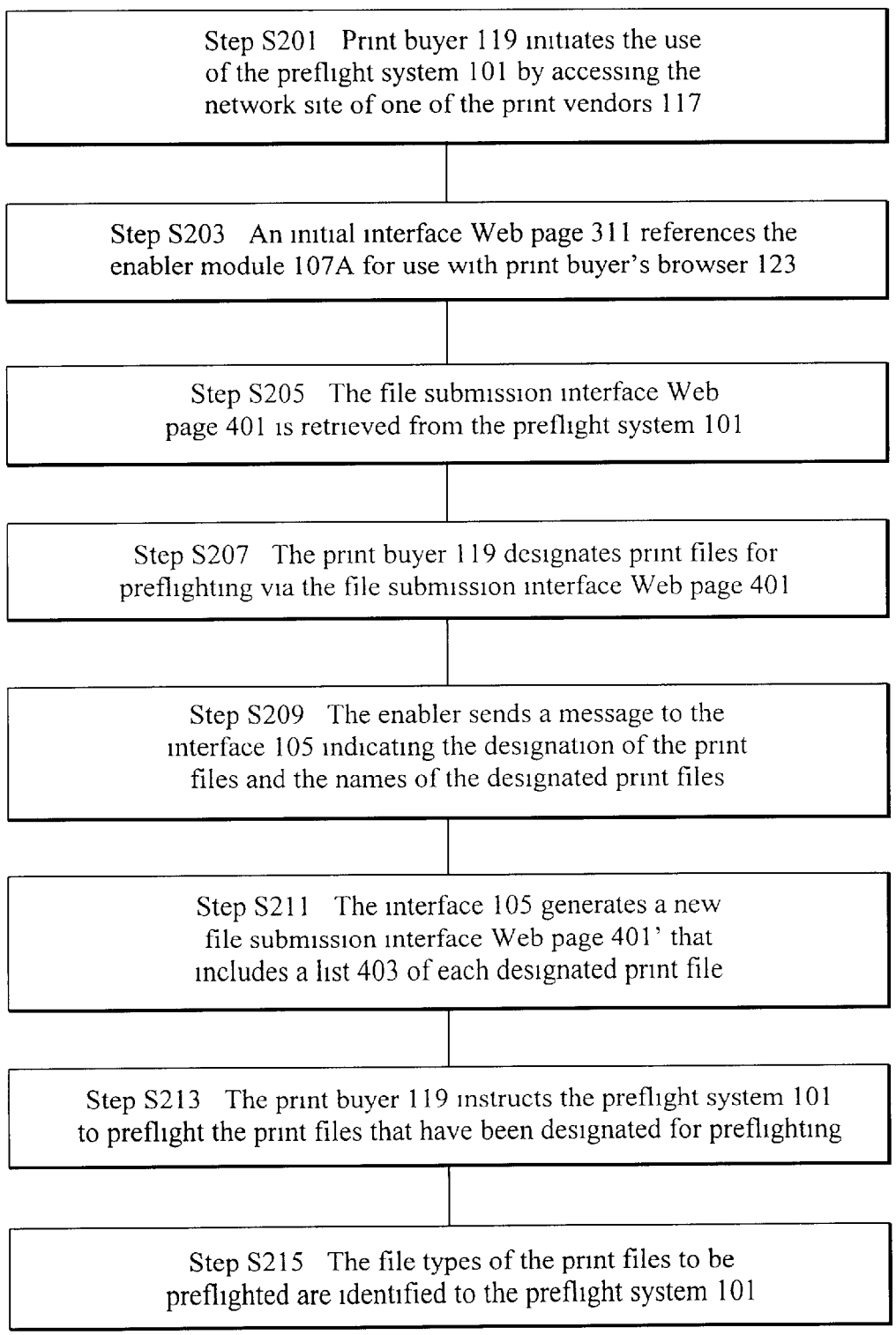
FIGS. 2A and 2B illustrate a method of preflighting according to one embodiment of the invention.
Figure 2B:
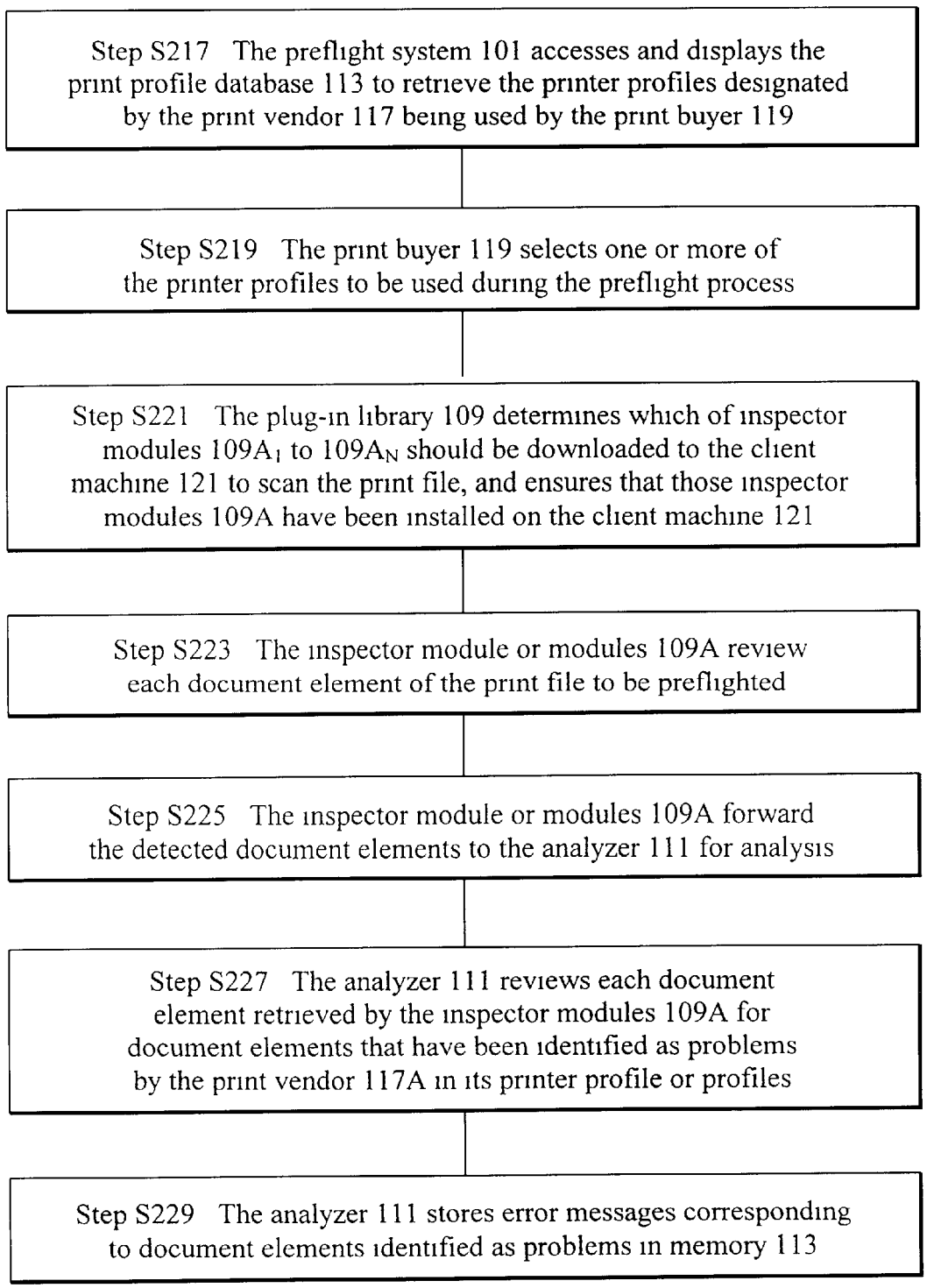
Figure 3:
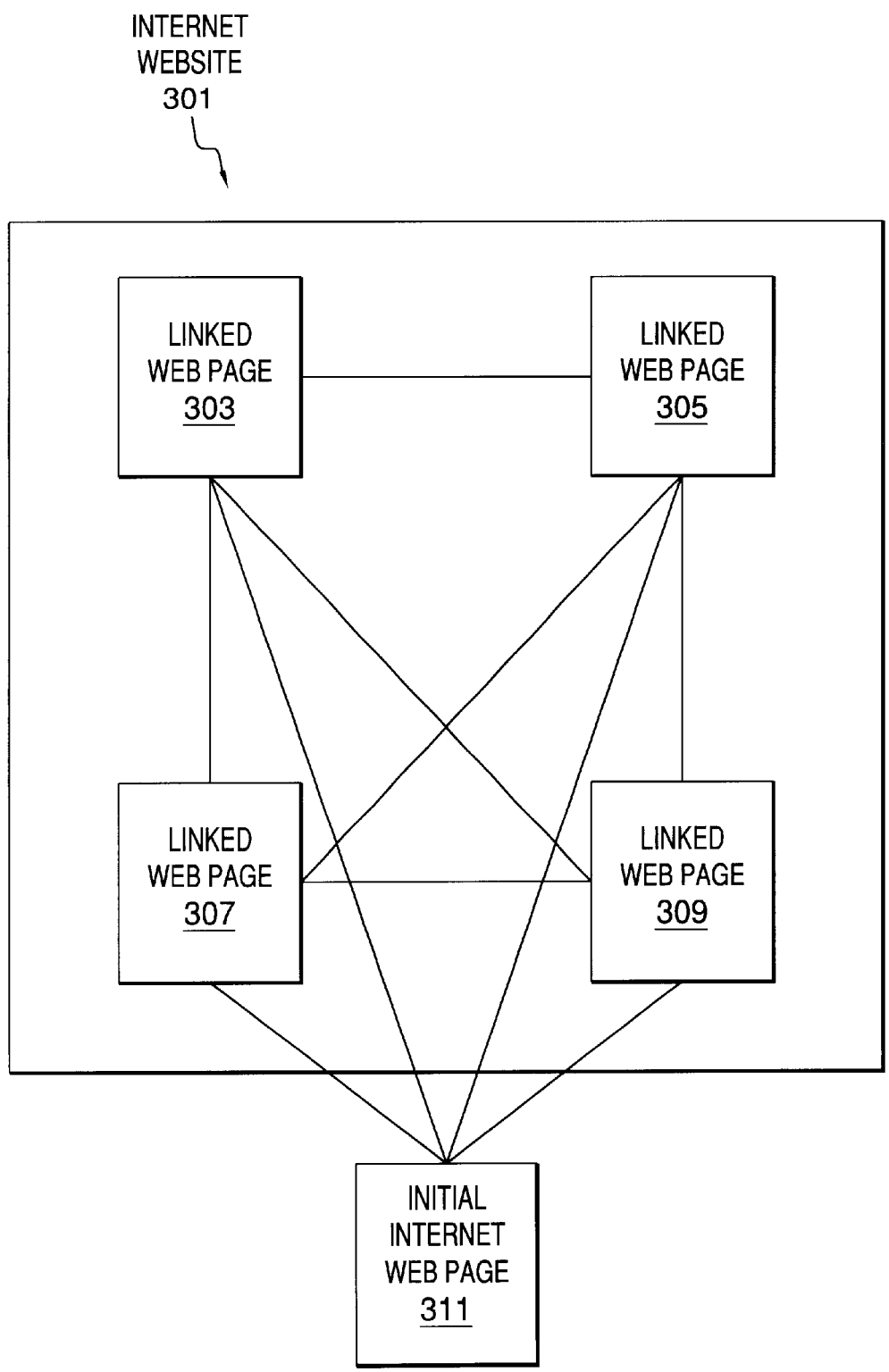
FIG. 3 shows a print vendor's Web site including a link to an initial interface Web page according to one embodiment of the invention.

The operation of the preflight system according to one embodiment of the invention will now be described in detail with reference to FIGS. 2A and 2B. As shown in FIG. 2A, in step S201 a print buyer 119 may initiate the use of the preflight system 101 by accessing the network site (e.g., an Internet Web site) of one of the print vendors 117. For example, print vendor 117A may maintain an Internet Web site 301 as shown in FIG. 3. The Web site may include a number of linked Web pages 303–309 maintained by the print vendor 117A. The Web site 301 may also include a link to an initial interface Web page 311 maintained by the interface 105 on behalf of the print vendor 117A. That is, the interface 105 may maintain a Web page 311 that appears to be associated with the print vendor 117A (e.g., it may have the print vendor's 117A logo) but which is actually the initial interface page for accessing the preflight system 101. Alternately, one of the Web pages 303–309 may server to "frame" the initial interface page 311, such that the initial interface Web page 311 appears as a portion of one of the Web pages 303–309. Both the use of links and framing are known to those of ordinary skill in the art. In either embodiment, the print buyer 119 may access the preflight system 101 through the Web site 301 of the print vendor 117A, possibly without even realizing that the preflight system 101 is separate from the Web site 301 of print vendor 117A.

When a print buyer 119 retrieves the initial interface Web page 311 through the browser 123, the initial interface Web page 311 references the appropriate enabler module 107A for use with the browser 123 in step S203. As is known in the art, network browsers, such as Internet Explorerand Netscape Navigator, conventionally allow a Web page to include an HTML (Hypertext Mark-up Language) reference to a "plug-in" software program that operates in conjunction with the browser. If the plug-in has been installed on the client machine, then the reference in the Web page activates the plug-in. If the plug-in has not yet been installed, then the reference prompts the print buyer's browser 123 to install the plug-in. Thus, the reference to the appropriate enabler module 107A in the initial interface Web page 311 can determine if the most recent version of that enabler module 107A has been installed on the client machine 121, and initiates the download of the most recent version of that enabler module 107A to the client machine 121 if it has not.

It should be noted that, in some preferred embodiments of the invention, the initial interface Web page 311 is specific to the print vendor 117A. That is, the interface 105 provides an initial interface Web page 311A for the print vendor 117A, a different initial interface Web page 311B for the print vendor 117B, still a different initial interface Web page 311C for the print vendor 117C, and yet another different initial interface Web page 311D for the print vendor 117D. Accordingly, when the print buyer 119 accesses the preflight system 101 through initial interface Web page 311A, the system 101 recognizes that the print buyer 119 is interfacing the preflight system 101 through the Web site of the print vendor 117A.

Once the enabler module 107A has been activated to operate with the browser 123, in step S205 the enabler module 107A retrieves (from the interface 105) the file submission interface Web page 401 shown in FIG. 4. As discussed above, the enabler module 107A operates as a plug-in management system for the inspector modules 109A. With some embodiments of the invention, however, the enabler module 107A may additionally modify the operation of the browser 123 to implement interface functions for the various interface Web pages provided by the interface 105. For example, the enabler module 107A may modify the operation of the browser 123 to allow a print buyer 119 to submit files for preflighting by "dragging-and-dropping" the print files onto an interface Web page. That is, the enabler module 107A may allow the print buyer 119 to submit a print file to the preflight system 101 simply by moving the icon representing the print file to an interface Web page displayed on the browser 123, and recognize when a file or files have been dropped onto the file submission Web page 401 for preflighting. Alternately, the enabler module 107A may be used only as a plug-in management system for modules 109A–109θ, and one or more of the plug-in modules 109B–109θ may implement the interface functions of the preflight system 101.

Figure 5:
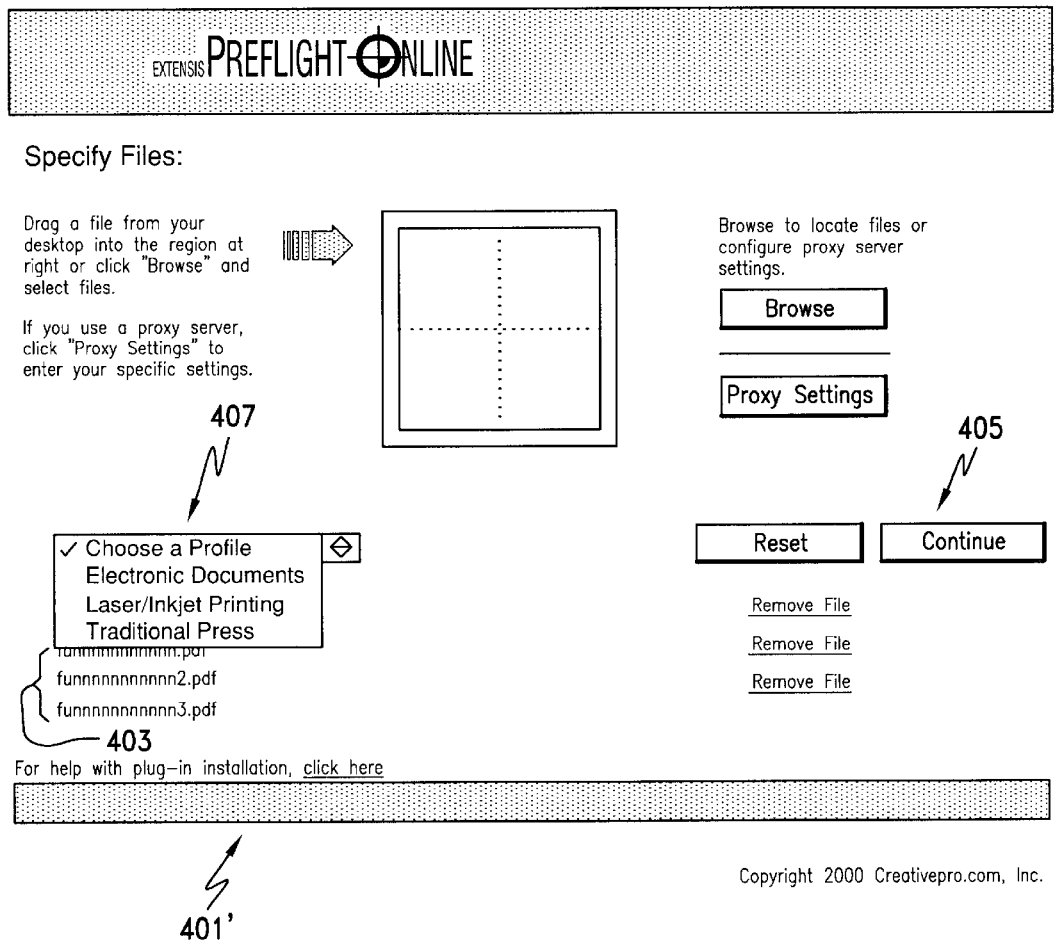

Thus, after the print buyer 119 has received the file submission interface Web page 401, the print buyer 119 can easily designate print files for preflighting simply by dragging and dropping the files onto the file submission interface Web page 401 in step S207. When the enabler module 107A recognizes that one or more files have been dropped onto the file submission interface Web page 401, the enabler sends a message to the interface 105 indicating the submission of the files, along with the names of the files, in step S209. In response, the interface 105 generates a new file submission interface Web page 401' in step S211, which includes a list 403 of each submitted file, as shown in FIG. 5. The print buyer 119 can then continue to submit files for preflighting by dragging and dropping them onto the new file submission interface Web page 401' (which creates an updated file submission Web page 401' that includes the new file or files in the list 403). Alternately, in step S213, the print buyer 119 can instruct the preflight system 101 to preflight the print files that have already been submitted by activating button 405 (marked "Continue") on the file submission Web page 401'.

In some preferred embodiments of the invention, the enabler module 107A also identifies the file types of the print files to be preflighted, and passes these file types back to the preflight system 101 in step S215. (Again, this identification function may alternately be performed by one or more of the plug-in modules 109B–109θ.) For client machines 121 employing the Microsoft Windows operating system, the enabler module 107A can easily identify the print file type by using the three-character suffix attached to the file name. If the client machine 121 is using an Apple Macintosh operating system, then the enabler can detect the print file type using the Macintosh creator code, which is a property of the file. Those of ordinary skill in the art will appreciate that other types of file identification techniques can be employed by the enabler 107A to identify the files submitted for preflighting. Further, it will be understood that another portion of the preflighting system 101 (e.g., the analyzer 111), other than the enabler module 107A, can identify the file type for each submitted print file in step S215.

As previously noted, the preflight system 101 can recognize which print vendor 117 the print buyer 119 is using by the initial interface page 311. Accordingly, in step S217, the controller 103 accesses the print profile database 115 to retrieve the printer profiles designated by the print vendor 117 being used by the print buyer 119. In the particular embodiment described herein, the print buyer 119 is accessing the preflight system 101 through the Web page 311A maintained for print vendor 117A, so the controller 103 accesses and displays the printer profiles set up by the print vendor 117A. For example, if the print vendor 117A has set up three different printer profiles for three different presses, then preflight system 101 preferably displays all three of those printer profiles for selection by the print buyer 119.

While the list of printer profiles may be displayed in a window of the Web page 401 (e.g., window 407), the interface 105 may alternately provide the browser 123 with a new Web page (not shown) displaying the list of printer profiles. In addition, depending upon the amount of print file information obtained by the enabler module 107A (or alternate plug-in module), the preflight system 101 may select a printer profile for the print buyer. For example, if the print file is for a special type of print job, then the preflight system 107A may select a printer profile from a print vendor specializing in printing that type of print job.

It should be noted that the list of profiles can be displayed in response to the print buyer 119 activating the button 405 to continue the preflighting process, or, for other embodiments of the invention, in response to the print buyer 119 using another command, such as the command phrase "Choose A Profile" shown in menu 407 on the Web page 401.

In step S219, the print buyer 119 then selects one or more of the printer profiles to be used during the preflight process. After the print buyer 119 has selected the printer profile or profiles, the plug-in library 109 determines in step S221 which of inspector modules $109A_1$ to $109A_N$ should be downloaded to the client machine 121 to scan the print file, and ensures that those inspector modules 109A have been installed on the client machine 121. Once the appropriate inspector module 109A has been downloaded to the client machine 121, in step S223 the inspector module 109A then begins to review each document element of the print file to be preflighted.

Figure 6:
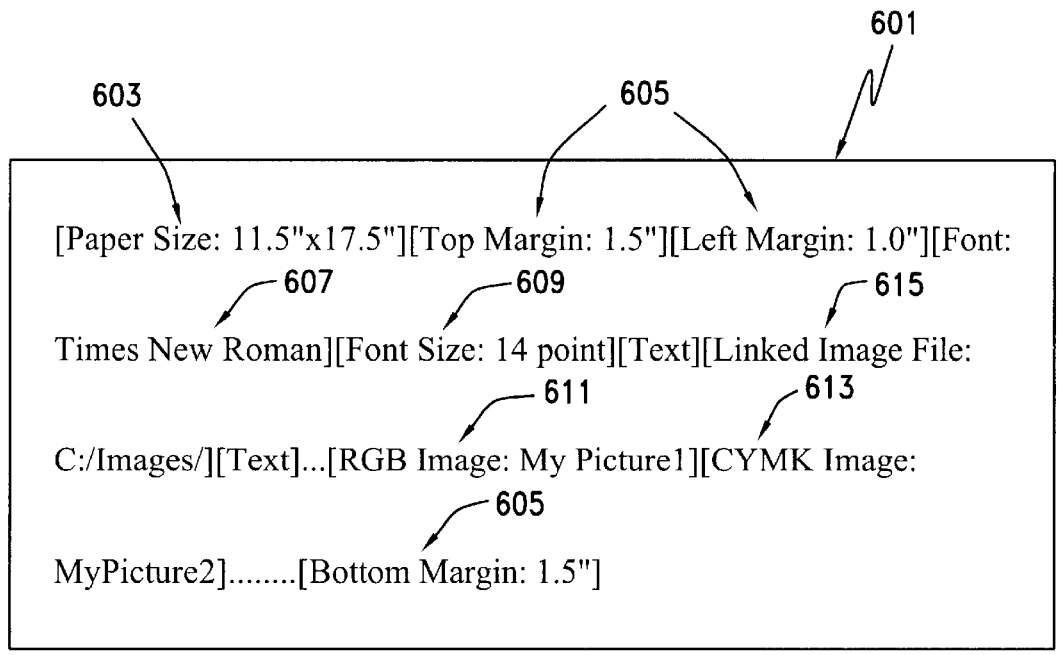
FIG. 6 illustrates the contents of a conventional print file.

As shown in FIG. 6, a print file 601 typically includes a number of document elements. These may include document elements 603 specifying paper size, document elements 605 specifying margins, document elements 607 specifying fonts, document elements 609 specifying text size, etc. The document elements of the print file may also include images, such as the RGB image 611 and the CMYK image 613. The document elements may also a document element 615 referencing one or more linked images, i.e., image files that are stored in a different file location and that are retrieved when the print file is to be printed.

The inspector modules 109A read through the print file 601 to detect each document element. As previously described, the inspector modules 109A are employed according to the type of file being scanned for print documents. Thus, if the print file being scanned is a file created by Quark Express, then the QuarkXpressinspector module $109A_1$ is used to scan through the print file, identifying each document element. If, during the process of inspection, the inspector module $109A_1$ encounters an embedded or linked file of a different type, e.g., a Microsoft Word file, then the inspector module $109A_1$ temporarily stops operation and the inspector module $109A_3$ (for scanning Microsoft Word files) is initiated to scan the embedded or linked Microsoft Word file. If the inspector module $109A_3$ for detecting document elements in Microsoft Word files has not previously been downloaded to the client machine 121, then the inspector module $109A_3$ is downloaded when the linked or embedded Microsoft Word file is detected. After the inspector module $109A_3$ for detecting Microsoft Word files has scanned the linked or embedded Microsoft Word file, it halts operation and reinitiates the operation of the first inspector module $109A_1$ (for scanning QuarkXpressfiles) to scan the remainder of the file.

It should be noted that the inspection process is recursive. That is, every inspector module 109A necessary to fully inspect a print file is employed. For example, with the explanation above, if the embedded Microsoft Word file itself had an embedded Adobe Photoshop file, then, when the inspector module $109A_3$ (for scanning Microsoft Word files) recognized the embedded Adobe Photoshop file, it would initiate the inspector module $109A_2$ (for scanning Adobe Photoshop files) to scan the embedded Adobe Photoshop file. This process is employed for each file type required to fully scan the print files submitted by the print buyer 119.

In addition, the inspection process is robust. If an inspector module 109A encounters an embedded or linked file type that does not have a corresponding inspector module 109A (i.e., a file type that is unrecognized or for which there is no inspector module 109A), then the embedded or linked file is simply ignored and the inspector module 109A continues on with its inspection. This prevents the preflighting operation from prematurely stopping when a new or unrecognized file type is in the print file.

As the inspector module or modules 109A detect document elements, the module or modules 109A forward the document elements to the analyzer 111 for analysis in step S225. As is known in the art, a particular document element may be difficult for a print vendor to process. For example, if the print vendor 117A has a press that can only print sheets with a size of 11×17½ inches or smaller, then a document element indicating a paper size of 20×25 inches cannot be processed by the print vendor 117A. In addition to particular document elements that are problems for specific print vendors, a print file may also contain document elements that would be generically difficult for any print vendor 117 to process. For example, if a print file included a link to an image file that does not exist (or which cannot be found), then no print vendor 117 would be able to process the print file with the link to the missing image file.

Accordingly, in step S227, the analyzer 111 reviews each document element retrieved by the inspector modules 109A for document elements that have been specifically identified as problems by the print vendor 117A in its printer profile or profiles that have been selected by the print buyer 119. Further, the analyzer 111 may also recognize generic problems, such as referenced or linked files that are missing, that would be a problem for any print vendor 117A to process.

With one embodiment of the invention, the analyzer 111 compares each document element provided by the inspector modules 109A with the list of document elements in the printer profile or profiles for print vendor 117A that were selected by the print buyer 119. When the analyzer 111 identifies a listed document element in the print file, it stores the corresponding error message in memory 113 in step S229. After the analyzer 111 has completed reviewing every document element associated with a print file, the collected error messages may be compiled from memory 113 into an error listing Web page 701, shown in FIG. 7. The interface 105 can then provide this page 701 to the browser 123 for review by the print buyer 119. The print buyer can employ the list 703 of error messages included on the Web page 701 to modify the print file before resubmitting the print file to the print vendor 117A, to ensure that the print file can be optimally printed by the print vendor 117A.

As was previously noted, an error message for a document element may include a universal resource locator (URL) address designated by the print vendor 117A. This URL address (or a link to this URL address) can be displayed on the error listing Web page 701 for use by the print vendor 117A. For example, the URL address can reference a Web page explaining in detail the particular problem that the print vendor 117A has with that specific document element. Further, the URL address may reference a Web page for providing detailed information to assist the print buyer 119 in changing or deleting the erroneous document element. Allowing the print vendor 117A to employ a URL address in the error message for its printer profile gives the print vendor 117A still greater flexibility in handling print problems. The print vendor 117A can easily change the content of the Web page addressed by the URL, without modifying its printer profile or disturbing the operation of the preflight system 101.

If a print file does not have any errors, then some embodiments of the invention may arrange to have the print file automatically forwarded to print vendor 117A for printing. For example, the enabler module 107A may include additional functionality that allows it to recognize and respond to an error listing Web page 701 that does not actually list any errors. If the enabler module 107A detects an error listing Web page 701 that does not contain any messages (or, for example, contains a message stating that the print file had no errors), then the enabler module 107A could instruct the browser 123 to retrieve a file transmission Web page from the print vendor 117A. The print buyer 119 could then use this page to submit the preflighted print file to the print vendor 117A. Alternately, the enabler module 107A can simply forward the print file to the print vendor 117A for printing, and generate a message for display on the browser 123 indicating when the file has been transmitted to the print vendor 117A.

According to still other embodiments of the invention, the print vendor 117A may set up its printer profile to distinguish between fatal errors (i.e., print file errors that cannot be corrected by the print vendor 117A) and correctable errors (i.e., print file errors that can be corrected by the print vendor 117A). With these embodiments, the analyzer 111 may generate two lists of error messages: one for use by the print buyer 119, containing messages corresponding to fatal errors, and another list for use by the print vendor 117A, containing messages corresponding to correctable errors (these messages may simply identify the error to the print vendor 117A). That is, the analyzer 111 may create a separate error list the correctable errors, in order to flag these correctable errors for special review by the print vendor 117A before printing.

If the analyzer 111 determines that the print file contains both "fatal" and correctable errors, then the analyzer will "fail" the print file. In this case, the interface 105 provides the browser 123 with an error listing Web page that includes both lists of errors. On the other hand, if the analyzer 111 determines that the print file contains no errors, or only contains correctable errors, then the analyzer will "pass" the print file. The preflight system 101 will then transmit the print file to the print vendor 117A for printing, along with the list of correctable errors in the print file (if any). This embodiment is particularly advantageous for the print vendor 117A. By using this embodiment, the print vendor 117A can accept all of the print files that it is capable of printing, but still quickly identify those print files that will require special attention before printing.

After a print file has been successfully preflighted and the preflight results posted to the error listing Web page for viewing by the print buyer 119 (or the print file forwarded to the print vendor 117A for printing), then the controller 103 registers a charge against the print vendor 117A for the preflight process. While the scan of the print file takes place on the local machine 121, and the document element analysis takes place within the preflight system 101, the preflight system 101 can correlate any preflight process to the print vendor 117 benefiting from the preflight process. This is because the print buyer 119 initiates the preflight process according to the invention through the print vendor 117 benefiting from the preflight process (i.e., by accessing the preflight system 101 via the print vendor 117 specific Web page 311). Accordingly, the preflight system 101 can accurately charge the most significant beneficiary of the preflight process, i.e., the print vendor 117, for the costs associated with the preflight process. The charge may be based upon a variety of criteria, including, for example, how many colors are in the print file, the size of the print file, the number of pages preflighted, the time required to preflight the print file, the number of print files preflighted, the number of profiles used for the preflight process, etc.

While the above embodiments of the invention have been described with reference to a single print buyer 119 and a plurality of print vendors 117A–117D, those of ordinary skill in the art will appreciate that the preflight system 101 according to the invention it intended to be used simultaneously by both multiple print vendors and multiple print buyers. Further, those of ordinary skill in the art will appreciate that the preflight system 101 according to the invention can be embodied in a number of different ways. For example, while the above-described embodiment of the invention uses Web pages to facilitate the transfer of information between the print buyer 119 and the preflight system 101, those of ordinary skill in the art will understand that other techniques can be employed. Also, while the preflight system 101 has been described as embodied on a common server (i.e., a server associated with multiple print vendors 117), it will be understood that any print vendor may embody the preflight system 101 according to the invention on a proprietary server.

The present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation ad illustrated and described. For example, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

We claim:

1. A preflight system, comprising:
   a printer profile database containing a list of problem document elements and a list of universal resource locator addresses, such that
   each of the universal resource locator addresses is associated with at least one of the problem document elements, and
   the list of problem document elements and the list of universal resource locator addresses are provided to the printer profile database by a print vendor;
   an analyzer that
   receives documents elements from a print file maintained by a print buyer,
   compares the document elements from the print file with the problem document elements to identify problem document elements occurring in the print file,
   compiles the universal resource locator addresses associated with problem document elements occurring in the print file into a first list of universal resource locator addresses,
   compiles universal resource locator addresses associated with problem document elements occurring in the print file into a second list of universal resource locator addresses, and
   provides the print buyer with at least the compiled first list of universal resource locator addresses.

2. The preflight system recited in claim 1, wherein at least one of the universal resource locator addresses associated with problem document elements occurring in the print file is for a page maintained by a print vendor.

3. The preflight system recited in claim 1, wherein at least one of the universal resource locator addresses associated with problem document elements occurring in the print file is for a page maintained by a print equipment manufacturer or retailer.

4. The preflight system recited in claim 1, wherein at least one of the universal resource locator addresses associated with problem document elements occurring in the print file is for a page describing at least one of the problem document elements associated with the at least one of the universal resource locator addresses.

5. The preflight system recited in claim 1, wherein at least one of the universal resource locator addresses is associated with more than one problem document element.

6. The preflight system recited in claim 1, wherein more than one of the universal resource locator addresses is associated with a single problem document element.

* * * * *